United States Patent [19]
Ishizaki

[11] Patent Number: 6,108,002
[45] Date of Patent: Aug. 22, 2000

[54] PROGRAM RESERVATION METHOD IN A CATV

[75] Inventor: Masayuki Ishizaki, Kawasaki, Japan

[73] Assignee: Fujitsu Limited, Kanagawa, Japan

[21] Appl. No.: 09/128,628

[22] Filed: Aug. 4, 1998

[30]     Foreign Application Priority Data

Mar. 19, 1998  [JP]  Japan ................................. 10-070933

[51] Int. Cl.[7] ............................... H04N 7/14; H04H 1/00
[52] U.S. Cl. ........................... 345/327; 348/12; 348/906; 455/4.2; 455/5.1; 709/217
[58] Field of Search ..................... 709/217–219; 348/7, 12, 13, 6, 10, 906; 455/4.2, 5.1, 3.1, 4.1, 6.1, 6.2; 345/326, 327

[56]                References Cited

U.S. PATENT DOCUMENTS

| | | | |
|---|---|---|---|
| 5,179,439 | 1/1993 | Hashimoto | 455/4.1 |
| 5,357,276 | 10/1994 | Banker et al. | 348/7 |
| 5,465,385 | 11/1995 | Ohga et al. | 455/6.1 |
| 5,699,107 | 12/1997 | Lawler et al. | 348/13 |
| 5,822,123 | 10/1998 | Davis et al. | 348/906 |

FOREIGN PATENT DOCUMENTS 4-87492  3/1992  Japan .

Primary Examiner—John W. Miller
Attorney, Agent, or Firm—Helfgott & Karas, PC.

[57]                ABSTRACT

On delivering a program on an On Demand method of a Cable TV, program reservation information is generated for each route of a communication line in a Cable TV center and is provided to a subscriber in order to restrain the number of digital lines in respect of the number of subscribers in a predetermined number and efficiently utilize equipment set in the center's side while maintaining the On Demand service to the subscriber. The subscriber thereby can recognize a reservation status of a program in respect of his or her own route and, if he or she desires simultaneous delivery of a program already reserved, an overlapping reservation of the program a third party reserved can be made. Communication lines can be efficiently utilized by simultaneously transmitting a program to the same communication line in this way.

12 Claims, 14 Drawing Sheets

FIG. 9

(a) DATA STREAM IN AN ARBITRARY TIME ACCORDING TO THE CONVENTIONAL METHOD

| SUBSCRIBER a | SUBSCRIBER b | SUBSCRIBER c | SUBSCRIBER d | SUBSCRIBER e | → t |

(b) DATA STREAM IN AN ARBITRARY TIME ACCORDING TO THE PRESENT INVENTION

| SUBSCRIBER a, f, g | SUBSCRIBER b, h | SUBSCRIBER c | SUBSCRIBER d, i | SUBSCRIBER e | → t |

IN SHADED UNITS, PROGRAMS SHALL BE SUPPLIED TO OVERLAPPED SUBSCRIBERS

FIG. 11

| DATE | TIME | TITLE | NUMBER OF RESERVATIONS | NOTES (FEE) |
|---|---|---|---|---|
| 6/30 | 18:00 ~20:00 | TERMINATOR 2 | 5 | 400/500 |
| 6/30 | 18:30 ~20:30 | DIE HARD 3 | 1 | 500 |
| 6/30 | 18:30 ~20:30 | ALIEN 2 | 3 | 450/500 |
| ≀ | ≀ | ≀ | ≀ | ≀ |
| 7/ 6 | 8:00 ~ 9:45 | TSURIBAKANISSHI 8 | 1 | 500 |

FIG. 12

| ROUTE | DATE | TIME | TITLE | NUMBER OF RESERVATIONS | NOTES (FEE) |
|---|---|---|---|---|---|
| A (KAMIODANAKA DIRECTION) | 6/30 | 18:00 ~20:00 | TERMINATOR 2 | 5 | 400/500 |
| | 6/30 | 18:30 ~20:30 | DIE HARD 3 | 1 | 500 |
| | 6/30 | 18:30 ~20:30 | ALIEN 2 | 3 | 450/500 |
| | ≀ | ≀ | ≀ | ≀ | ≀ |
| | 7/ 6 | 8:00 ~ 9:45 | TSURIBAKANISSHI 8 | 1 | 500 |

⇧
RESERVATION TABLE CAN BE SEEN FOR EACH ROUTE INFORMATION

FIG. 13

| ROUTE | DATE | TIME | TITLE | NUMBER OF RESERVATIONS | NOTES (FEE) |
|---|---|---|---|---|---|
| B( KOSUGICHO DIRECTION ) | 7/10 | 18:00 ~20:00 | ERASER | 5 | 400/500 |
| | 7/10 | 18:30 ~20:30 | THE INTERNET | ☆1 | 500 |
| | 7/10 | 18:30 ~20:30 | JUMANJI | 3 | 450/500 |
| | ⟨ | ⟨ | ⟨ | ⟨ | ⟨ |
| | 7/14 | 8:00 ~10:00 | UNDER SIEGE 2 | ☆1 | 500 |

FIG. 14

| DATE | TIME | NUMBER OF RESERVATION | ROUTE INFORMATION | FEE | NOTES |
|------|------|-----------------------|-------------------|-----|-------|
| \multicolumn{6}{l}{PROGRAM TITLE: ERASER} | | | | | |
| 7/13 | 8:00 ~10:00 | 3 | A | 450/500 | |
| 7/13 | 9:30 ~11:30 | 1 | C | 500 | *EXCLUSIVE VIEW CHANNEL |
| 7/13 | 16:00 ~18:00 | 2 | B | 480 | |
| 7/13 | 20:00 ~22:00 | 5 | E | 400/500 | |
| 7/14 | 10:00 ~12:00 | 1 | A | 500 | |
| 7/14 | 13:00 ~15:00 | 2 | D | 480 | |
| ⁓ | ⁓ | ⁓ | ⁓ | ⁓ | |
| 7/19 | 22:00 ~24:00 | 3 | A | 450/500 | |

PROGRAM TITLE: ERASER
LIST OF RESERVATIONS: SECOND WEEK IN JULY (JULY 13 TO 19)

FIG. 15

ROUTE: AREA A
LIST OF RESERVATIONS: SECOND WEEK IN JULY (JULY 13 TO 19)

| DATE | TIME | PROGRAM TITLE | NUMBER OF RESERVATIONS | FEE |
|------|------|---------------|------------------------|-----|
| 7/13 | 8:00 ~10:00 | ERASER | 3 | 450/500 |
| 7/13 | 10:00 ~12:00 | UNDER SIEGE 2 | 1 | 500 |
| 7/13 | 16:00 ~18:00 | JUMANJI | ☆1 | 500 |
| 7/13 | 20:00 ~22:00 | THE INTERNET | 2 | 480 |
| 7/14 | 10:00 ~12:00 | ERASER | 1 | 500 |
| 7/14 | 13:00 ~15:00 | JUMANJI | 2 | 480 |
| ⁓ | ⁓ | ⁓ | ⁓ | ⁓ |
| 7/19 | 22:00 ~24:00 | ERASER | 3 | 450/500 |

PROGRAM RESERVATION METHOD IN A CATV

BACKGROUND OF THE INVENTION

The present invention relates to an interactive service utilizing digital transmission by a Cable TV (CATV).

In a conventional Cable TV, a pay service called Pay Channel is offered. This requires an agreement for a desired channel in advance, and a subscriber requests an operator at a center to subscribe for a pay program channel in advance by a telephone call or a request form. The operator receiving the request registers the pay program channel in a host computer for administering subscribers in accordance with the request and thereby activates a micro computer at a terminal of the subscriber's side based on the registered data. The Pay Channel is devised so that, when it is permitted to receive the requested pay channel through this procedure, operation of a descramble portion shall be possible, that is, scramble of signals are released to make viewing of the pay program channel possible.

There is also a system called Pay Par View (PPV). This is not an agreement per pay program channel but a mode for purchasing per program that a subscriber desires to view. It is common to give a program number for each program to control a pay program in the PPV.

Since a certain subscriber purchases a program at a specific time in order to correspond to the PPV, an exclusive use channel is required for delivering a program to the subscriber. Although a conventional Cable TV station conducting analog transmission has the capacity to transmit television channels almost 60 in number, the reality is that about 30 channels, only a half of the total number, is utilized in the actual service. These 30 channels consist of programs such as programs for program suppliers transmitted by ground television broadcasting and broadcasting and communication satellites and programs planned and produced by cable television operators independently. Community programs or the like in close contact with communities such as cities, towns and villages are included in the independently produced programs.

As described above, although a Cable TV has the capacity of transmitting 60 channels, same bands are in fact secured for television broadcasting electric waves and some channels cannot be actually used due to distortion of electric waves or the like generated from equipment. Therefore, the reality is that about 40 channels are actually available for use and the number of channels to be assigned to individual subscribers for delivering pay programs as PPV by a Cable TV center is limited to only a few.

Incidentally, the analog transmission of the conventional technology could transmit only one program channel for a 6 MHZ cable band. However, it has become possible to transmit, using one analog channel band, about a few channels of animation image signals (MPEG2) digitally compressed by transmitting digital signals inside cables due to the recent progress of technology.

Further, the conventional Cable TV line uses coaxial cable lines up to 450 MHZ, but transmission lines called a city type Cable TV using optical fiber together with coaxial lines has become common.

In the transmission lines, a highway system is laid with transmission lines of optical fiber to the vicinity of a subscriber's home from a Cable TV center and the last distance of about 1 km is connected with coaxial cable lines. Recently, most of the regions planning to transmit from a center by optical fiber utilize the city type Cable TV. The city type Cable TV simultaneously functions as transmission lines for interactive communication as well and is discussed to be used as an interactive type Cable TV system.

With such background as described above, digitalization of AV (Audio Visual) and networking have advanced rapidly and digital technology based on computer technology is spotlighted as represented by the Information Super-Highway Plan in the United States of America, a country advanced in a Cable TV.

In an interactive service by such a Cable TV, it is common to be rendered such limitation as QAM output channel limitation arising from the number of QAM modulator being a center facility and limitation arising from available frequency channels, starting with output stream number limitation of a video server. Incidentally, QAM (Quadrature Amplitude Modulation) is one of digital modulation methods with increased frequency utilization efficiency.

Although frequency utilization efficiency is increased, simultaneous delivery is only possible to subscribers equivalent to the number of bands (6 MHZ band channel) X multiple channels.

On the other hand, a subscriber wishes to have desired programs delivered at the time he or she wants to watch them. However, if lines for all the subscribers are to be secured, it will lead not only to the increase of facility expenses at a center's side but also to problems deriving from limited space for setting center facilities.

The present invention has been devised in view of the problems and it is the technical subject to provide technology utilizing equipment set in a center's side by restraining the number of digital lines to subscribers to a predetermined number while maintaining on-demand services to subscribers.

SUMMARY OF THE INVENTION

According to a first aspect of the present invention, in a Cable TV system delivering program information to a subscriber's terminal connected via the management center and communication lines, a program reservation information generating means for generating program reservation information for each route of communication network is provided in a management center, and a reservation instruction inputting means for receiving reservation setting of a subscriber and a displaying means for displaying program reservation information generated by the program reservation information generating means are both provided in a subscriber's terminal.

A subscriber can recognize the program reservation status for his or her own route and can make a reservation overlapping a program reserved by a third party if he or she wishes to be simultaneously delivered a program already reserved, by generating program reservation information for each line of communication lines. Since communication lines can be efficiently utilized by simultaneously transmitting a program on the same communication line as described above, inexpensive delivery of programs shall be possible.

According to a second aspect of the present invention, at least the title of a program, the deliver time of a program and the number of reservation of a program are set to be included in the program reservation information.

Displaying the number of reservation of a program in this way makes it easy for a subscriber to make an overlapping reservation for a program already reserved by a third party.

According to a third aspect of the present invention, in the Cable TV center, a reservation setting means for setting a program reservation based on an input from a reservation instruction inputting means of a subscriber's terminal, a reservation number calculating means for calculating the number of reservations for each program based on the set contents of the reservation setting means and a fee calculating means for determining a viewing fee based on the number of reservations for each program calculated by the reservation number calculating means are provided together with the program reservation information generating means.

The fee calculating means is provided so that a fee is set to be lower as the number of overlapping reservation of the same program increases. In this manner, since program view reservation of subscribers can be accumulated to inexpensive simultaneous delivery, efficient utilization of a communication network shall be possible because.

According to a fourth aspect of the present invention in the Cable TV center, a route identifying means for identifying a route to a subscriber's terminal is provided so that the program reservation information generating means generates program reservation information for each route based on information obtained from the line identifying means.

Generating program reservation information for each line in this way makes it possible for a subscriber to properly grasp a reservation status in his or her own route.

According to a fifth aspect of the present invention, in the program reservation information generating means, an exclusive view determining means for determining whether or not an exclusive view exists for each program is provided so that whether or not an exclusive view exists is displayed for each program displayed as program reservation information to be generated based on information from the exclusive view determining means.

In this manner, exclusive display has become possible during program reservation and is made distinguishable from an inexpensive provision of programs by simultaneous delivery.

According to a sixth aspect of the present invention, the management center is provided with a program delivering means and the program delivering means refers to program reservation information and, if a reservation for the same program exists in the same time zone, conducts simultaneous transmission of the same program to a plurality of subscriber's terminals by using the same routes of the transmission network.

In this manner, simultaneous transmission of a program has become possible by using a delivery network to the same route, and communication line resources can be efficiently utilized.

BRIEF DESCRIPTION OF THE DRAWINGS

In the accompanying drawings:

FIG. 9 is an explanatory diagram showing the status of data stream assignment to subscribers in optical and coaxial transmission networks in accordance with the conventional technology and the embodiment of the present invention;

FIG. 11 is a program reservation table displayed in accordance with the embodiment of the present invention;

FIG. 12 is a program reservation table displayed in accordance with the embodiment of the present invention;

FIG. 13 is a program reservation table displayed in accordance with the embodiment of the present invention;

FIG. 14 is a program reservation table displayed in accordance with the embodiment of the present invention;

FIG. 15 is a program reservation table displayed in accordance with the embodiment of the present invention;

DETAILED DESCRIPTION OF THE PREFERRED EMBODIMENTS

Figure 1:
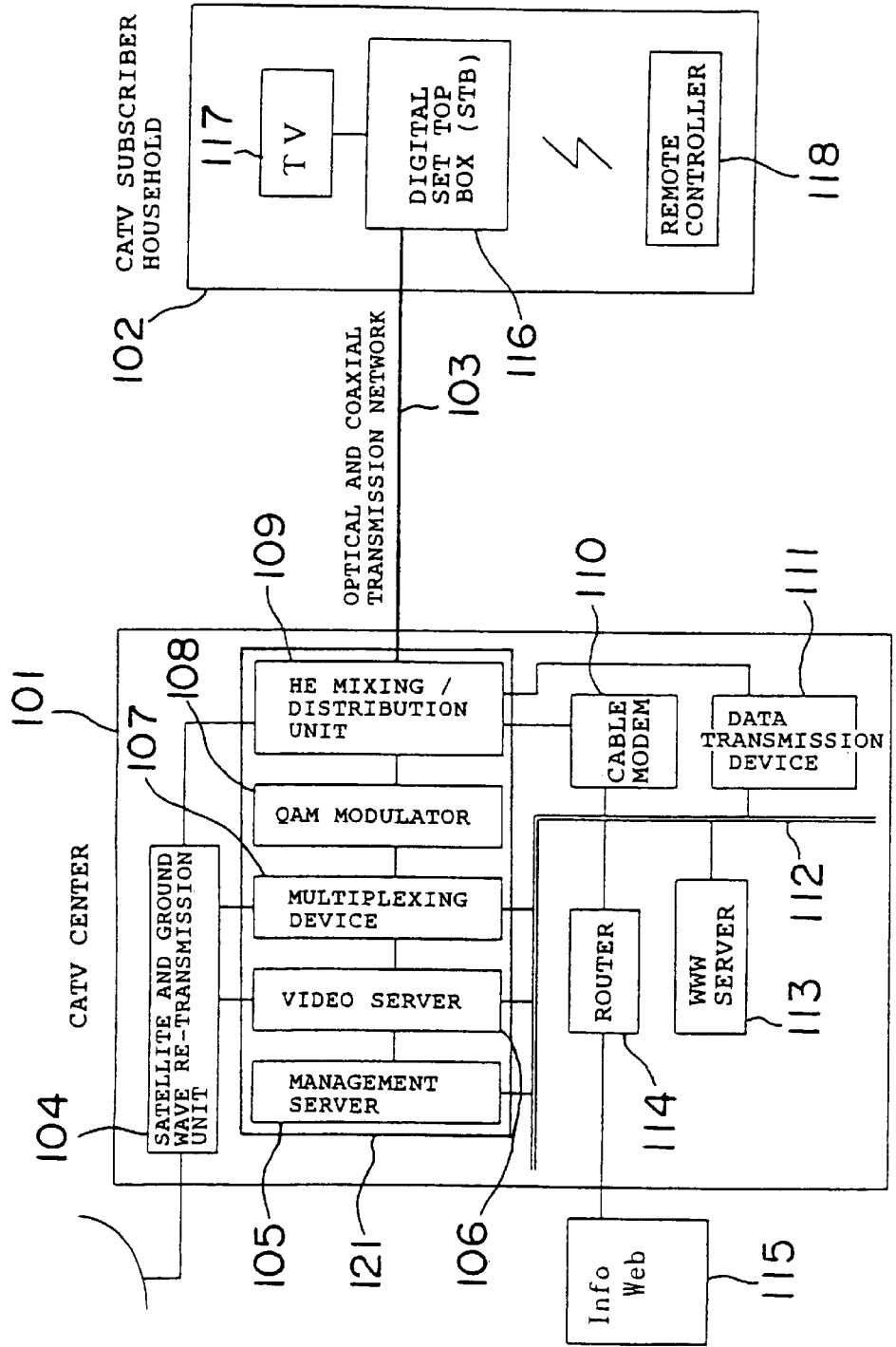
FIG. 1 is a block diagram showing an arrangement of a Cable TV system.

FIG. 1 shows a arrangement of a city type digital Cable TV system.

A Cable TV center 101 and a Cable TV subscriber household 102 are linked by an optical and coaxial transmission network 103 of the optical coaxial hybrid method, which enables program delivery from the Cable TV center 101 and program reservation from the Cable TV subscriber.

A satellite and ground wave re-transmission portion 104 has a function of receiving satellite broadcasting and ground waves of general broadcasting stations and is in the arrangement which enables satellite to broadcast programs and ground wave programs to the Cable TV subscriber as well.

A management server 105 controls various types of equipment via a bus 112 to which a WWW (World Wide Web) server is connected to deliver information of the Cable TV center itself on the Internet. In addition, the management server 105 is connected to an outside provider server 115 as well via a router 114, which enables an access to the Internet. When an access is made from the Cable TV subscriber household 102 to the outside Internet provider 115, the access is via a cable modem 110 and the router 114.

Figure 3:
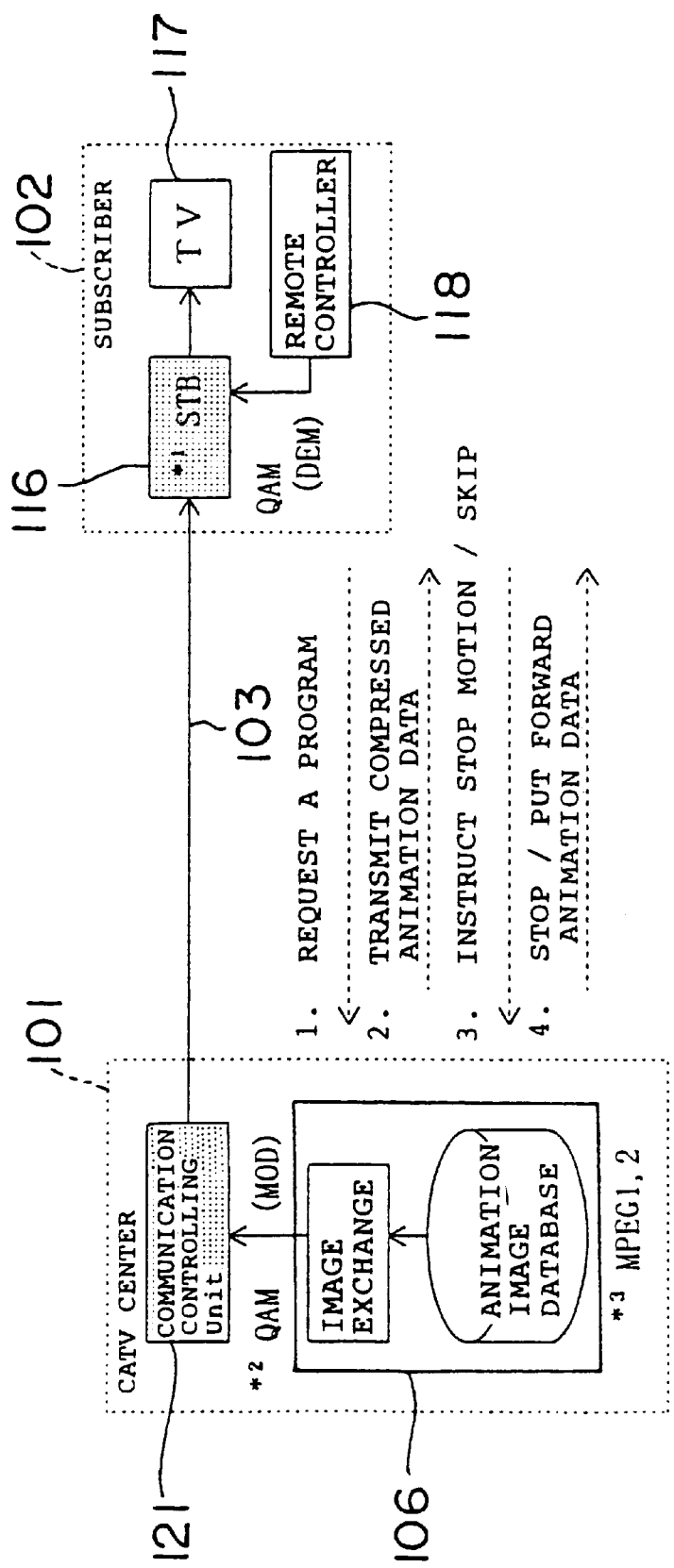
FIG. 3 is a block diagram showing a basic procedure of VOD.
Figure 4:
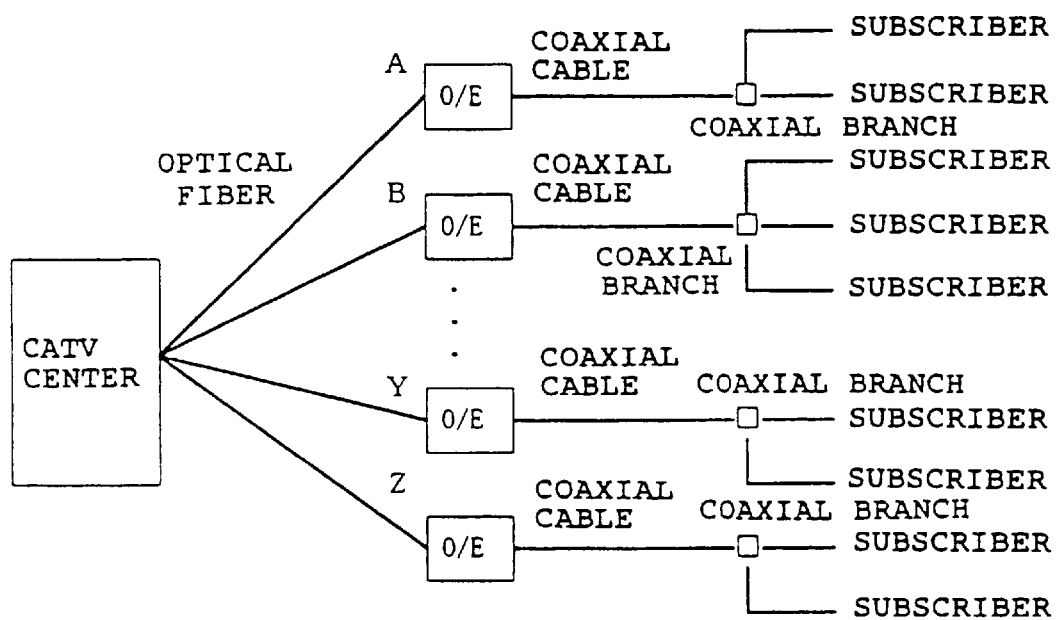
FIG. 4 is a block diagram showing an arrangement of a transmission line of city type Cable TV.

Further, the management server 105, a video server 106, a multiplexing device 107, a QAM(Quadrature Amplitude Modulation) modulator 108 and a HE mixing/distributing unit 109 in the Cable TV center 101 function as a communication controlling unit 121(see FIG. 3).

Figure 16:
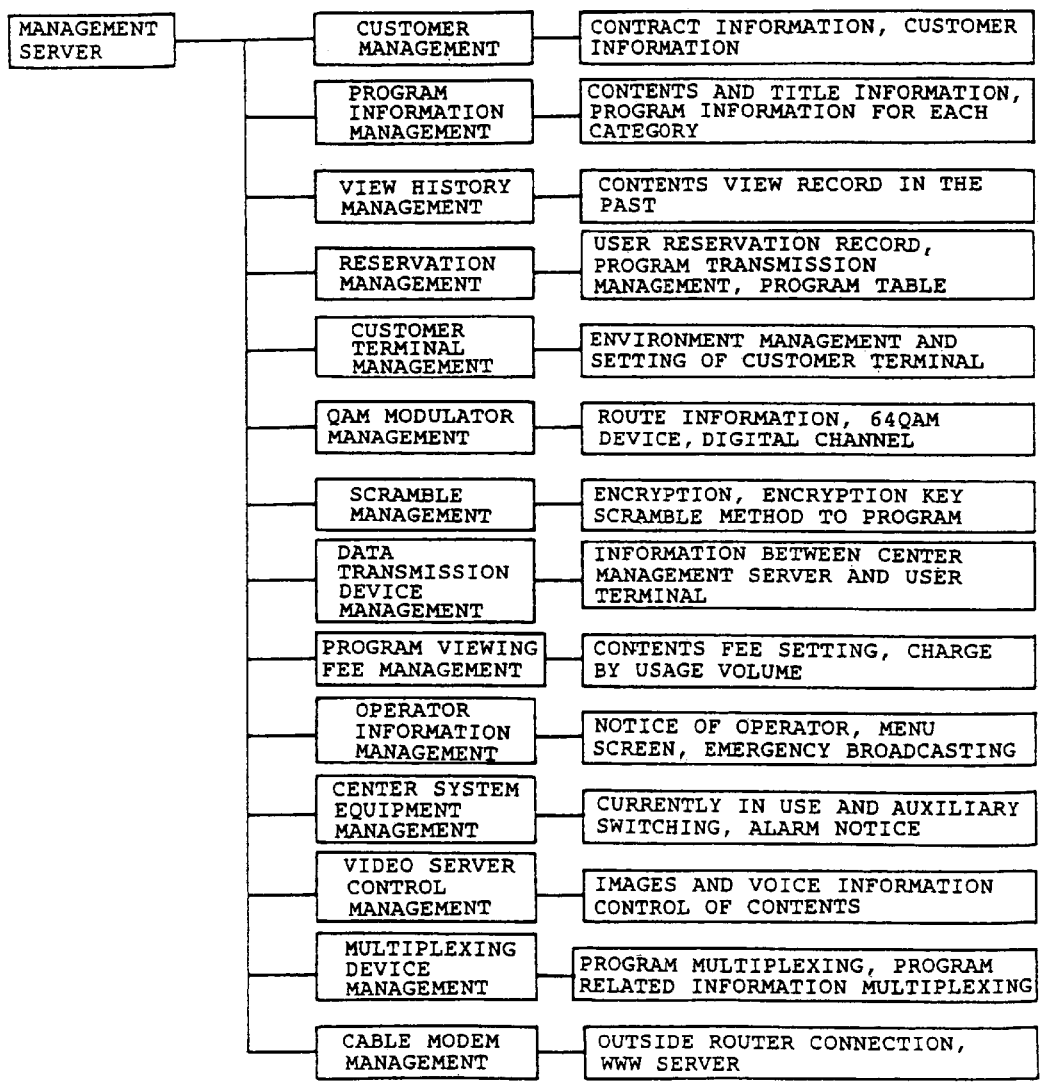
FIG. 16 is a diagram showing a list of management information of a management server in accordance with the embodiment of the present invention.

In addition, FIG. 16 shows a list of management information managed in the management server 105.

The Cable TV subscriber household 102 has a digital set top box (STB) 116 terminating the optical and coaxial transmission network 103, a television unit 117 for reproducing images and voice and a remote controller 118 for operating them.

The Cable TV center 101 is provided with the video server 106 for controlling delivery of animation images, the multiplexing device 107 for delivering various kinds of data to each subscriber, the QAM modulator 108 and the HE mixing/distributing unit 109 for terminating the optical and coaxial transmission network 103.

Figure 2:
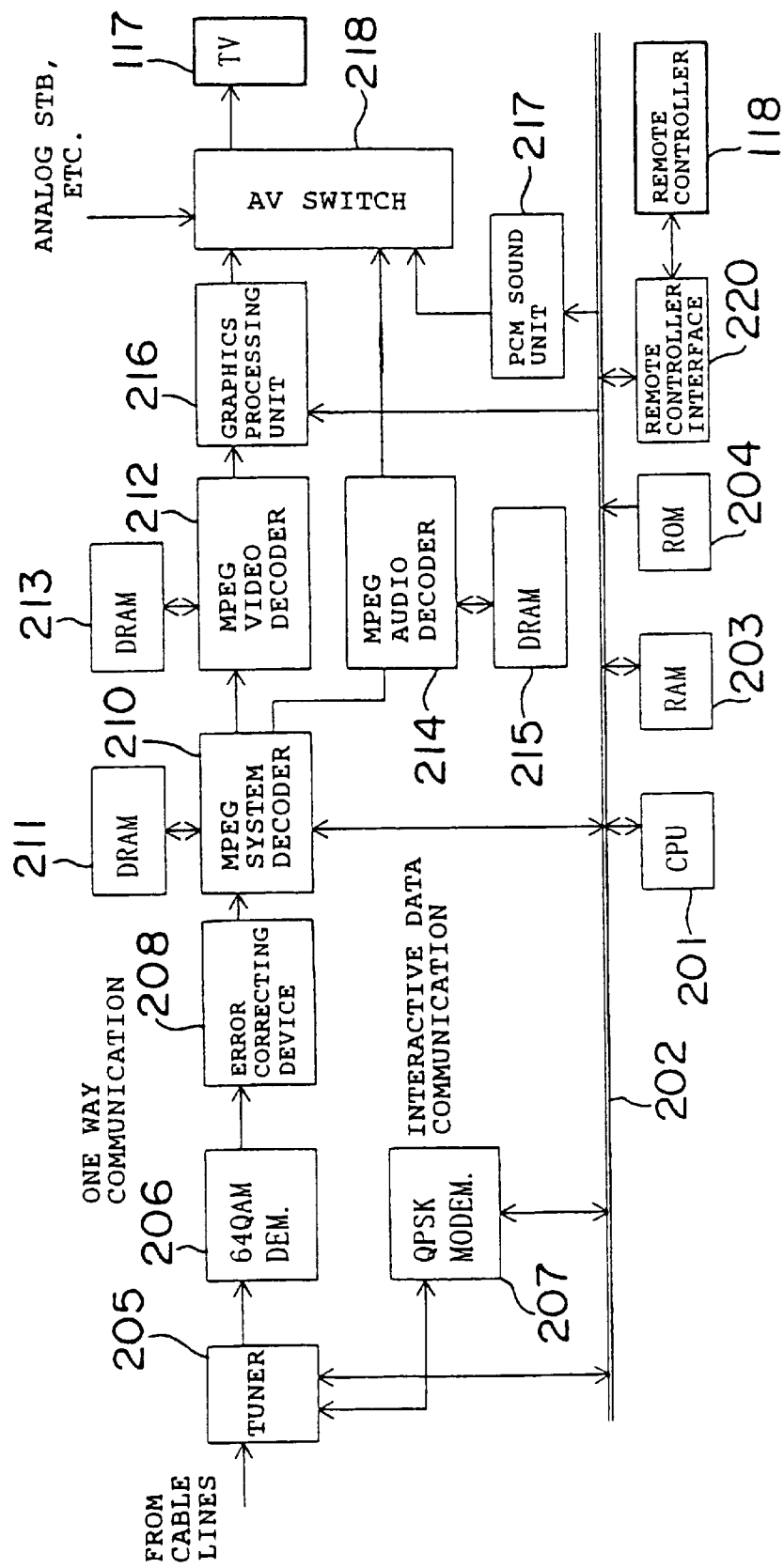
FIG. 2 is a block diagram showing an internal arrangement of a digital set top box in accordance with an embodiment of the present invention.

FIG. 2 is a block diagram showing a composition of the digital set top box (STB) 116 in the Cable TV subscriber household 102.

In the digital set top box (STB) 116, the section lower than a bus 202 with a CPU 201 in the center in the figure makes up a computer system provided with a RAM 203 and a ROM 204 and the like, and the section upper than the bus 202 in the figure makes up a replay system of program data.

In the figure, reference numeral 205 denotes a tuner which selectively receives programs designated by a subscriber with the operation of the remote controller 118 via a remote controller interface 220.

Reference numeral 207 denotes an interactive data transmission modulating unit (QPSK MODEM) and reference numeral 206 denotes a one way data transmission modulating unit (64 QAM MODEM). Reference numeral 208 denotes an error correcting device which corrects errors in received program data. An MPEG system decoder 210 conducts processing of extracting animation image data and voice data of the MPEG format separately from the received program data. Further, animation image data among the extracted MPEG data is outputted to an AV switch 218 as animation image data via an MPEG video decoder 212 and a graphics processing unit 216. Similarly, voice data is outputted to the AV switch 218 via the MPEG audio decoder 214.

In addition, the above mentioned MPEG system decoder 210, MPEG video decoder 212 and MPEG audio decoder 214 have DRAM 211, 213 and 215, respectively, as a buffer for data processing.

Moreover, digital data inputted via the bus 202 is outputted to the outside from the AV switch 218 processed in a PCM sound processing unit 217.

Various interactive services such as VOD (Video On Demand) for providing a subscriber's desired program at a desired time and Television Shopping for enabling purchase of necessary goods by retrieving information on goods at home as well as delivery of games and karaoke can be provided by using system equipment set in the Cable TV center 101 and the Cable TV subscriber household 102.

Moreover, Internet service in a communication environment in which a high-speed access using the optical and coaxial transmission network 103 is possible can be offered if the digital set top box (STB) 116 is used as a cable modem using a personal computer (not shown) set in a subscriber household or another cable modem is prepared.

Interactive services utilizing the above mentioned Cable TV system such as Video On Demand, karaoke delivery, game delivery, television shopping, personal computer communication, Internet, voice telephone, television telephone/conference, sales in the software downloading format and remote education shall be realized.

A detailed operation procedure of Video On Demand (hereinafter referred to as VOD) is shown in FIG. 3 as an example of interactive services.

VOD is a method with which a subscriber accesses a Cable TV center via the digital set top box (STB) 116 when he or she desires to watch and receives delivery of a program such as a desired movie from the Cable TV center. That is to say, the subscriber requests a desired program to the Cable TV center 101 from the digital set top box (STE) 116 using the remote controller 118 in the first place.

To the contrary, the Cable TV center 101, in response to the request from the subscriber, reads animation image data of a program such as a movie based on the request out of an animation image database accumulated in the video server 106 by the control of the communication controlling unit 121 and exchanges images, and transmits the data to the subscriber household 102 via the optical and coaxial transmission network 103 by the QAM method. At the time of such animation image replay, the subscriber can stop the replay of animation images at an arbitrary position by operating the remote controller 118 and can skip the replay. That is to say, the digital set top box (STB) 116, when recognizing a cut in signal from the remote controller 118 during the replay of animation images, notifies an instruction code (e.g. pausing) from the remote controller 118 to the communication controlling unit 121 of the Cable TV center 101 and the communication controlling unit 121 thereby controls the replay of animation images from the video server 106 to be in a pausing status. Such series of operations enables the subscriber to control the replay of animation images delivered from the Cable TV center 101 in the same feeling he or she has at the time of replay by a video player at home.

However, the downward lines of the Cable TV system (the flow form the Cable TV center 101 to the subscriber household 102 in the optical and coaxial transmission network) is limited in the number of channels. That is to say, if a fully independent service should be provided to all the subscribers, monopoly status of bands in the optical and coaxial transmission network 103 shall be larger for each subscriber.

Further, as to the video server 106, the number of streams simultaneously outputting one video title is limited depending on a video outputting ability of the video server 106.

As described above, it is common to be rendered such limitations as QAM output channel limitation arising from the number of QAM modulator 108 being a center facility and limitation arising from available frequency channels, starting with output stream number limitation of a video server 106.

Since the usage band of the optical and coaxial transmission network is limited especially for the number of QAM channels, simultaneous delivery is only possible to subscribers equivalent to the number of band (6 MHZ band channel) X multiple channel.

On the other hand, a subscriber wishes to have desired programs delivered at the time he wants to watch them. However, it will lead not only to the increase of facility expenses at a center's side but also to problems derived from limited space for setting center facilities if lines for all the subscribers are to be secured.

Due to the above mentioned reasons, the same concept as the simultaneous calling ratio in a telephone switching network is applied to the center facilities. That is to say, the center facilities are completed by assuming how high the frequency of subscribers simultaneously accessing the center and simultaneously using the downward lines. As a concrete value, it is assumed that about thirty percent of total number of subscribers access the center simultaneously. The percentage goes up and down depending on problems in a region where each operator develops services, program contents relating to family composition of subscribers living in the region or services and so on. It would be desirable if the costs of the center facilities will be lowered, equipment will be compact and a service will be offered in the form of a plurality of lines per one subscriber.

Figure 5:
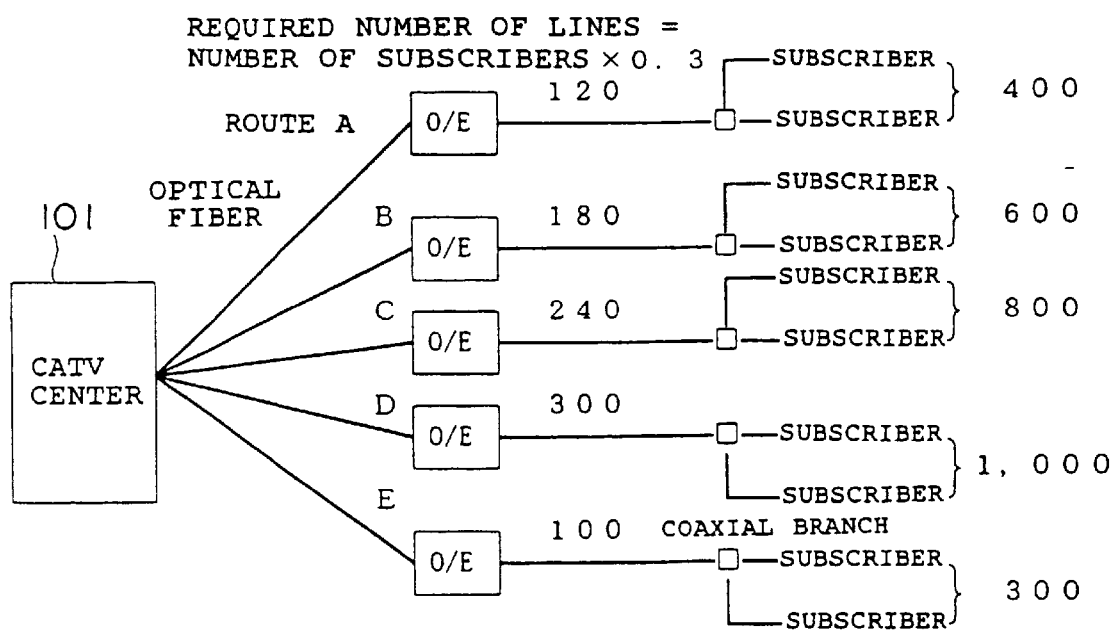
FIG. 5 is a diagram showing the required number of digital lines in city type Cable TV.

Here, referring to FIG. 5, the line capacity of a concrete transmission line of a city type Cable TV is calculated.

It is assumed here that there are transmission lines extending to five routes as an example.

Each route is referred to as "route A" to "route E" and the number of subscribers connected to each route is defined as follows:

| Route Name | Number of Subscribers |
|---|---|
| "Route A" | 400 |
| "Route B" | 600 |
| "Route C" | 800 |
| "Route D" | 1000 |
| "Route E" | 300 |

As described above, assuming that the percentage of subscribers being offered the VOD service simultaneously is 30 percent of the number of subscribers connected to each route, the required number of lines is as shown below. The number of lines in this case means the number of exclusive usage of a line through which each subscriber is offered interactive service.

| Route Name | Number of Subscribers | Required Number of Lines (Number of Subscribers × 0.3) |
|---|---|---|
| "Route A" | 400 | 120 |
| "Route B" | 600 | 180 |
| "Route C" | 800 | 240 |
| "Route D" | 1000 | 300 |
| "Route E" | 300 | 100 |

The required number of 64 QAM being a digital modulating device to be set in the Cable TV center 101 side is calculated from the required numbers of lines.

Prior to explaining the calculation, transmission capacity at 64 QAM and the number of programs which can be multiplexed in the 6 MHz band are explained. 64 QAM is a modulation and demodulation method used as standardization of digital transmission of Cable TV, and ANNEX C defined in the ITU-T J.83 is adopted in Japan. According to the standardization, digital signal of 31.644 bps can be put through the conventional analog 6 MHz band.

Although the line capacity in the 6 MHz band depends on a demodulation method to be used, the extent to which MPEG images compressed in the line capacity can be multiplexed depends on each program being information to be transmitted. The image bit rate in the MPEG2 method means coded data up to 15 Mbps and the following image bit rates are generally adopted according to program contents:

Sports programs (Programs with intense movements) . . . 5 to 6 Mbps

Foreign Movies . . . 3 to 5 Mbps

Animation Films . . . About 3 Mbps

Although the above bit rates can be controlled at will by the compression rate of an encoder for compressing images, the above bit rates are calculated with ordinary image quality as an object.

That is to say, assuming that the program bit rate of the average 5 Mbps are multiplexed and transmitted, the number of 64 QAN modulation devices in one analog channel band is calculated as follows:

| Route Name | Subscribers | Number of Required Lines (Subscribers × 0.3) Number of 64QAM Devices |
|---|---|---|
| "Route A" | 400 | 120 |
| 20 | | |
| "Route B" | 600 | 180 |
| 30 | | |
| "Route C" | 800 | 240 |
| 40 | | |
| "Route D" | 1000 | 300 |
| 50 | | |
| "Route E" | 300 | 100 |
| 17 | | |
| Total 157 | | |

Figure 6:
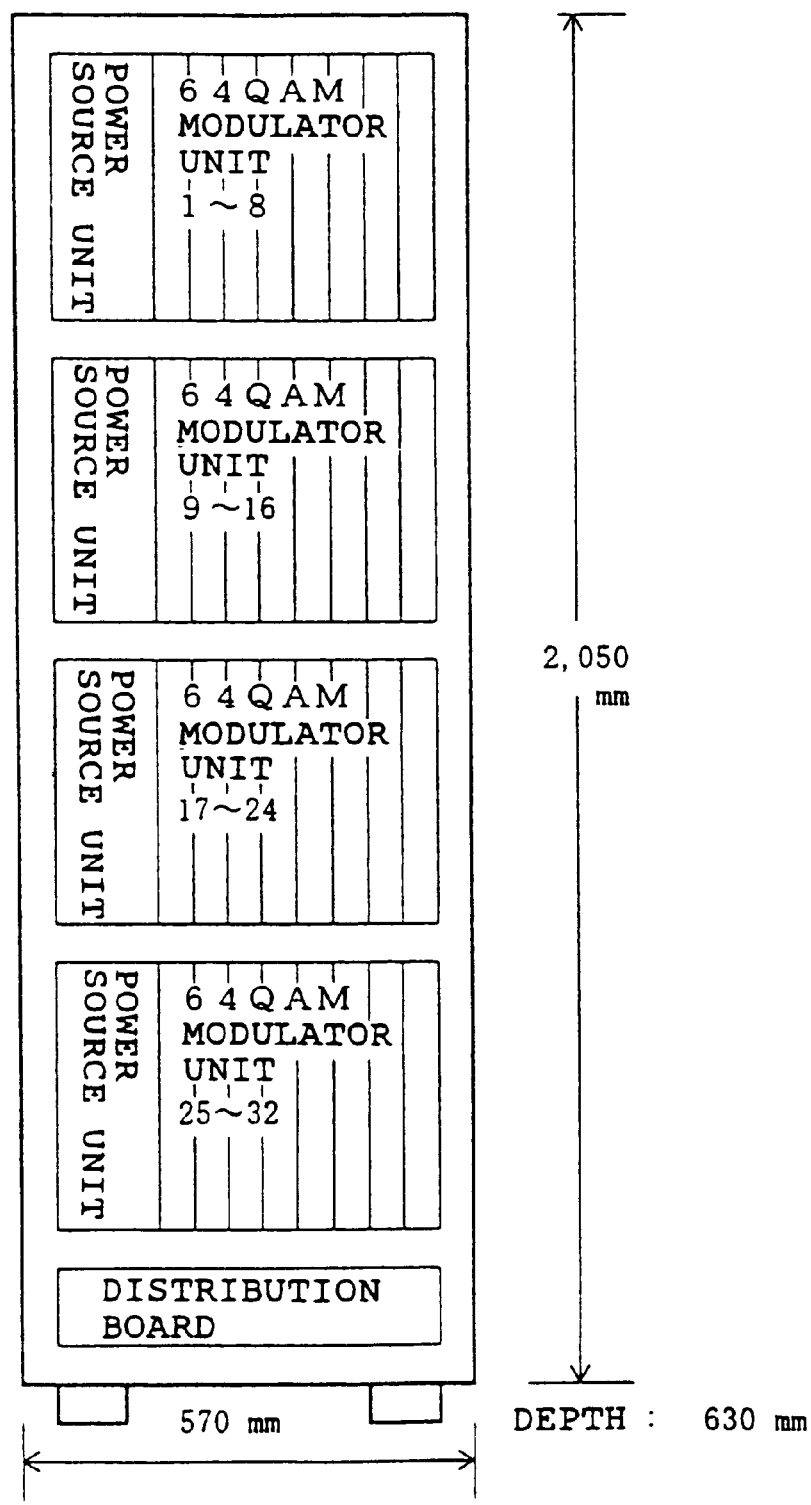
FIG. 6 is a diagram showing the scale of a 64 QAM modulation device set in a Cable TV center.

Although the actual size of the 64 QAM device has been progressed to be compact recently, it is limitted to house about 32 devices in one base (width 570×depth 630×height 2050 mm) currently. An example of 64 QAM modulation devices housed in a base is shown in FIG. 6.

An operator having the city type transmission line described in FIG. 5 must assign about five bases in order to house 157 64 QAM modulators.

Figure 7:
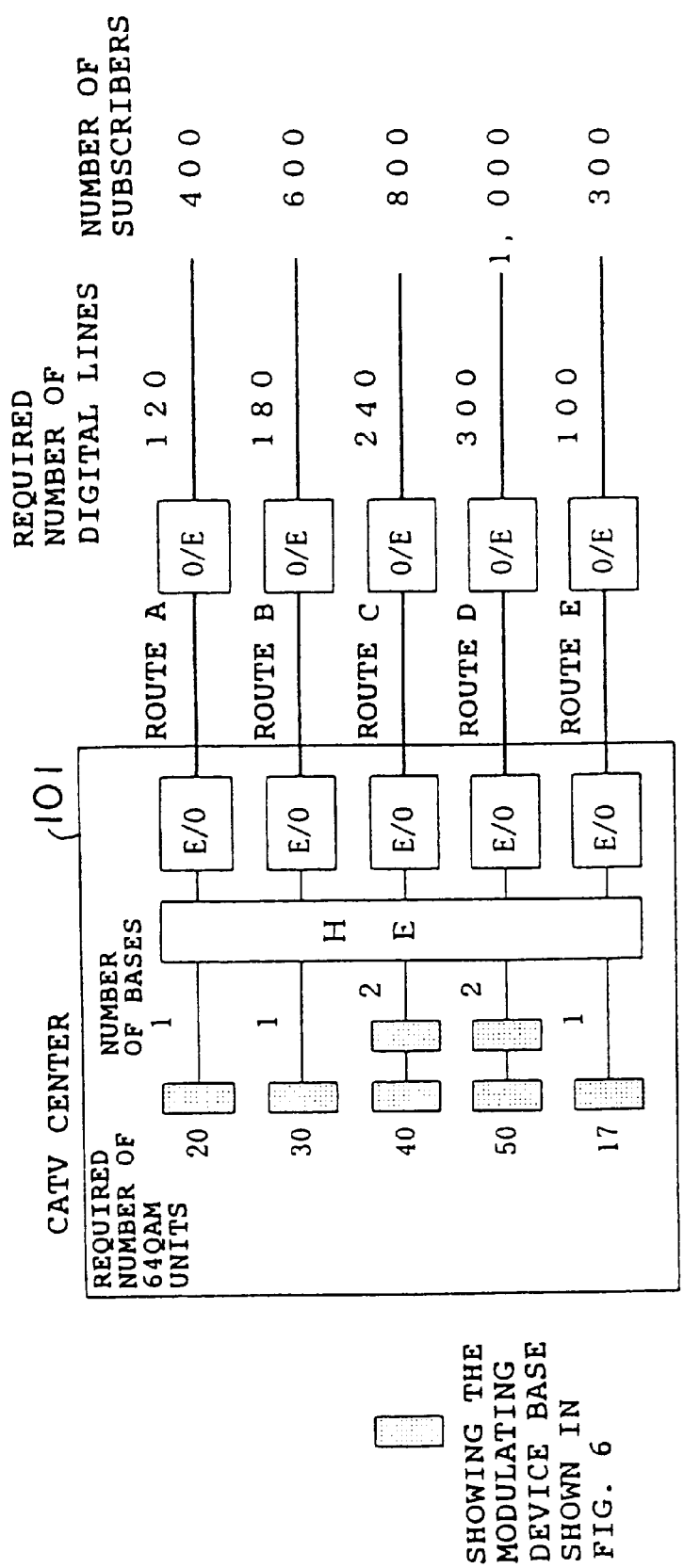
FIG. 7 is a diagram showing the number of 64 QAM modulation device units and the number of bases required in each line.

Although the above results are obtained by a simple calculation, it is desirable that an independent base is set for each route as shown in FIG. 7 in an actual operation, and if an auxiliary modulator for each route is provided, the number of bases shall be further increased as in the routes C and D in which the required number of bases is increased to two as shown in FIG. 7, which makes the total required number of modulation device bases seven.

However, since the equipment setting space in the Cable TV center 101 is limited, it is realistic for any operator to set center equipment in as minimum space as possible to operate. Due to this reason, there is also a solution to lower overall equipment investment by restraining the simultaneous usage rate at less than thirty percent if it can be further lowered. In addition, even if thirty percent of the line capacity is secured in the current status, gradual increase of subscribers will make the line capacity rate lower as far as the center does not invest in equipment.

Figure 10:
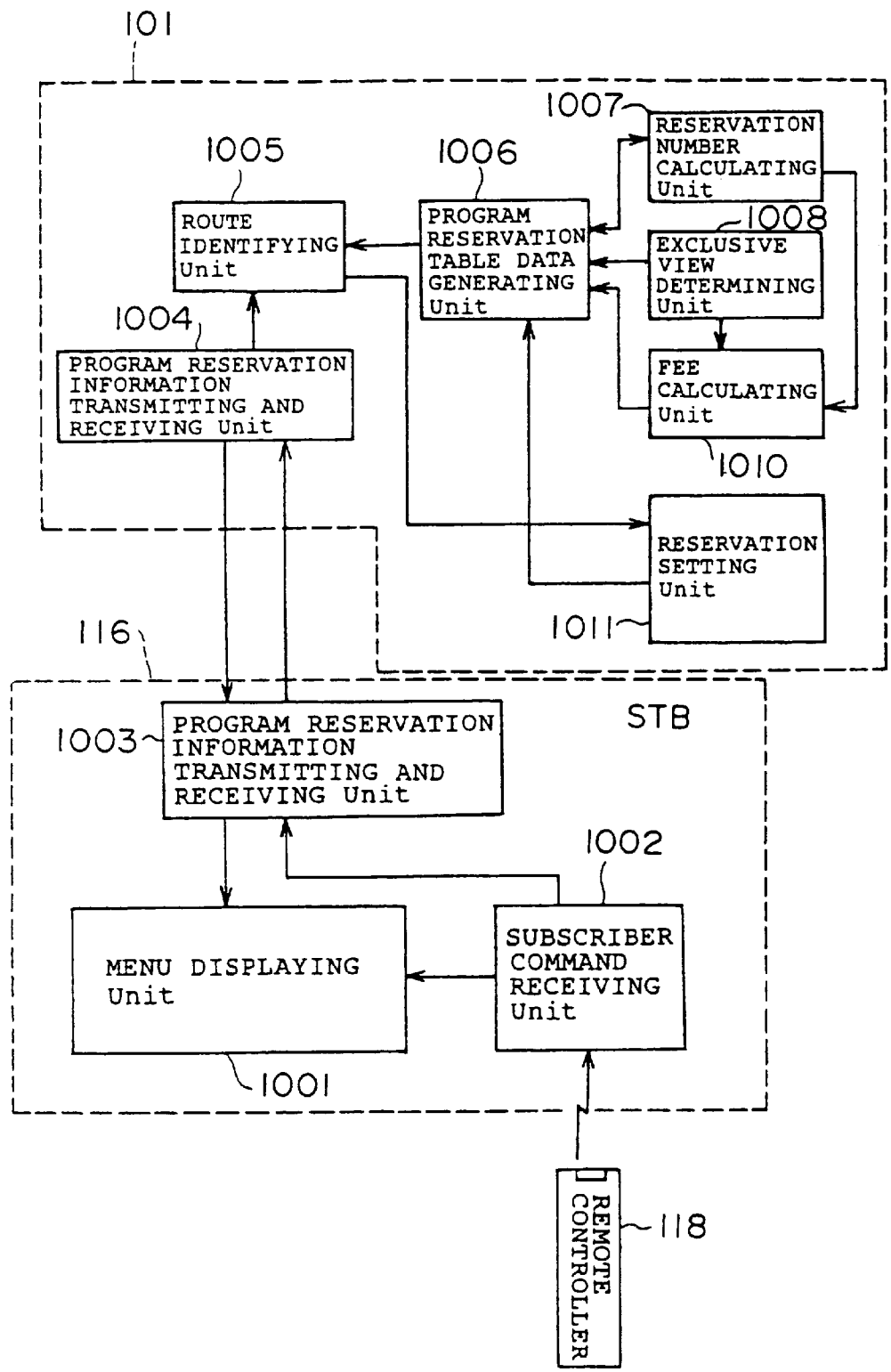
FIG. 10 is a functional block diagram of a Cable TV center and a digital set top box concerning reservation receipt in accordance with the embodiment of the present invention.

In the embodiment, the problem is solved by improving a program reservation system in VOD as described in a functional block diagram shown in FIG. 10.

In the figure, a menu displaying unit 1001, a subscriber command receiving unit 1002 and a program reservation information transmitting and receiving unit 1003 are provided in the digital set top box (STB) 116 set in the Cable TV subscriber household 102. The menu displaying unit 1009 can actually be realized with the television unit 117 displaying menu data delivered from the Cable TV center 101. The subscriber command receiving unit 1002 can be realized with a remote controller interface 220 such as an infrared ray receiving portion provided in the digital set top box (STB) 116. The program reservation information transmitting and receiving unit 1003 can be realized with the interactive data communicating unit 207, the tuner 205 and so on.

A program reservation information transmitting and receiving unit 1004 corresponding to the program reservation information transmitting and receiving unit 1003 of the digital set top box 116, a route identifying unit 1005 for identifying a route of the optical and coaxial transmission network 103 to the Cable TV subscriber household 102, a program reservation table data generating unit 1006, a reservation number calculating unit 1007, an exclusive view determining unit 1008, a fee calculating unit 1010 and a reservation setting unit 1011 are respectively provided in the Cable TV center 101.

The reservation program table data generating unit 1006 generates a program reservation table in accordance with route information from the route identifying unit 1005. That is to say, the reservation program table data generating unit 1006 has the function of detecting the Cable TV subscriber household 102 to which delivery is available by the optical and coaxial transmission network 103 of the same route and generating own program reservation table data in respect of the route. Reservation table data in this case means displayed data making up a program reservation table shown in FIG. 11. In the figure, a list of planned delivery in respect of the same route as that of the Cable TV subscriber household is shown in the program reservation table. Date, time, title, the number of reservations and notes (fee) are shown in the figure.

The reservation number calculating unit 1007 calculates the number of reservations displayed in the program reservation table, that is the number of subscribers having made a reservation for the same program in the same route.

The exclusive view determining unit 1008 determines whether or not each program is in an exclusive view mode. In this case, an exclusive view mode means a mode for permitting a subscriber having made a reservation to do interactive replay of a program and permits operations similar to replay of video tapes such as pause, rewind, fast forward, skip search of replay of a program. Due to this fact, the number of reservation is limited to one in the exclusive view mode.

The fee calculating unit 1010 has a function of determining a fee for each program in the program reservation table. Although a basic fee depends on the value of contents of the program themselves, the fee fluctuates depending on the number of reservations and whether or not the exclusive view mode exists according to the embodiment. FIG. 12 shows a program reservation table in route A of the optical and coaxial transmission network 103, and it also shows that although "Terminator 2" to be provided from 18:00 to 20:00 on June 30th currently has the number of reservations of five and its viewing fee is 500 yen, if a subscriber looking at the program reservation table makes a new reservation for the program, the fee shall be 400 yen.

Further, FIG. 13 is an example of a program reservation table in case display of an exclusive view mode is added. In the program reservation table in respect of route B of the optical and coaxial transmission network 103, although the number of reservations for a program titled "The Internet" to be provided from 18:30 to 20:30 on July 10th is one, an asterisk indicating an exclusive view mode is attached to prohibit other subscribers make an overlapped reservation for the program. Therefore, a subscriber having made a reservation of the program on an exclusive mode can enjoy replay of the program on an exclusive mode but cannot receive the benefit of lower fee for program viewing derived from the increase in the number of subscribers making a reservation.

The reservation setting unit 1011 has a function of receiving a reservation command from a subscriber by a remote controller and setting the reservation, and the set contents at the reservation setting unit 1011 shall be reflected on the above mentioned program reservation table.

FIG. 14 and FIG. 15 show other examples of the program reservation table. FIG. 14 shows a program reservation status of a plurality of routes as well as that of a single route, in which whether or not an exclusive view mode exists is shown in the notes column of the program table. Further, FIG. 15 is an example showing a program reservation status in a week format.

FIG. 9 shows program delivery at an arbitrary time on demand from a subscriber in a conventional method and program delivery of the embodiment as data streams on routes (optical and coaxial transmission network).

As shown in FIG. 9 (*a*), the optical and coaxial transmission network 103 is exclusively owned by respective program data of each of the subscribers a to e, but according to the embodiment, programs having a plurality of reservations can be delivered simultaneously to a plurality of subscribers and the optical and coaxial transmission network 103 can be efficiently utilized.

Figure 8:
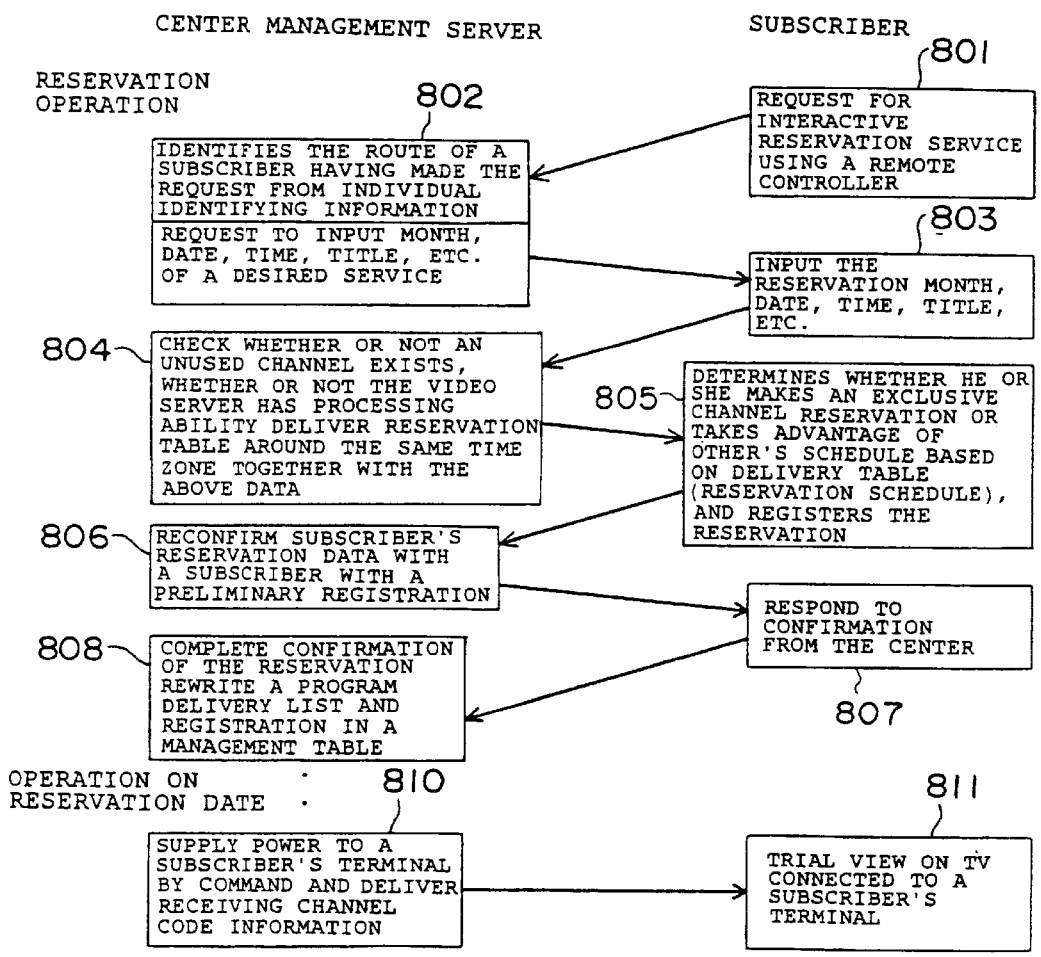
FIG. 8 is a diagram showing a processing procedure in VOD in accordance with the embodiment of the present invention.

With reference to FIG. 8, program reservation procedures between a subscriber and the Cable TV center 101 are now described in detail.

A subscriber requests the Cable TV center 101 for program reservation service through the digital set top box (STB) 116 by using the remote controller 118 (step 801).

On receipt of the request, the route identifying unit 1005 of the Cable TV center 101 then identifies the route of the subscriber having made the request (802) and urges the subscriber to input month, date, time and title of a desired service through the menu displaying unit 1001.

When the subscriber inputs the reservation month, date and time with the remote controller 118 in response to this (803), the program reservation table generating unit 1006 of the Cable TV center 101 checks whether or not an unused channel exists, whether or not the video server has processing ability and so on by accessing the management server 105 and the video server 106, and then collects information from the exclusive view determining unit 1008 and the fee calculating unit 1010 and generates a program reservation table for the route to transmit to the digital set top box (STB) 116 of the subscriber household 102 through the program reservation information transmitting and receiving unit 1004 (804).

The digital set top box (STB) 116 shows the program reservation table to the subscriber through the menu displaying unit 1001.

The subscriber, referring to the program reservation table displayed on the television unit 117 and taking into considerations whether or not an exclusive view channel exists, the number of subscribers making a reservation, fee and so on, determines whether he or she receives the delivery of a program taking advantage of the existing program reservation or makes a reservation of his or her own for a new program separately from the existing one and, in this case, whether he or she makes it an exclusive view mode or permits other subscribers to make simultaneous reservations later, then registers the reservation with the remote controller 118 (805).

Preliminary registration is made at the Cable TV center 101 based on the reservation registered by the subscriber. The preliminary registration may regenerate the program reservation table including the reservation from the subscriber through the program reservation table data generating unit 1006 and has the subscriber redisplay it or may display the information of the preliminary registration only (806).

Then, the reservation of the program delivery is completed at the reservation setting unit 1011 of the Cable TV center 101 (808) when the subscriber presses a confirmation button of the remote controller 118 (807)

The program data designated by the subscriber is delivered to the Cable TV center 101 and the subscriber household 102 through the optical and coaxial transmission network 103 at the time of the date reserved by the subscriber (801), and the program data shall be viewable with the television unit 117 connected to the digital set top box (STB) 116.

What is claimed is:

1. A program reservation device comprising:

program reservation information generating means provided in a management center for generating program reservation information transmitted to a subscriber's terminal for each route of a communication network;

reservation instruction inputting means provided in the subscriber's terminal for receiving a reservation setting of a subscriber; and displaying means for displaying the program reservation information generated by said program reservation information generating means delivering program information to said subscriber's terminal connected to said management center via the communication network, wherein said program reservation information contents are updated based on a reservation when the reservation is received from said subscriber's terminal in said program reservation information generating means.

2. The program reservation device according to claim 1, wherein said program reservation information includes at least a title of a program, delivery time of the program and number of reservations of the program.

3. A program reservation device according to claim 1, wherein said management center includes:

reservation setting means for setting the program reservation based on an input from the reservation instruction inputting means of the subscriber's terminal;

reservation number calculating means for calculating a number of reservations for each program based on set contents of said reservation setting means; and fee calculating means for determining a viewing fee based on the number of reservations for each program obtained from said reservation number calculating means, together with said program reservation information generating means.

4. The program reservation device according to claim 1, wherein said management center is provided with a route identifying means for identifying the route to the subscriber's terminal and said program reservation information generating means generates program reservation information for each route based on information obtained from the route identifying means.

5. The program reservation device according to claim 1, wherein said program reservation information generating means is provided with an exclusive view determining means for determining whether or not an exclusive view exists for each program and whether or not the exclusive view exists is displayed for each program that is displayed as program reservation information to be generated based on information from the exclusive view determining means.

6. The program reservation device according to claim 1, wherein said management center is provided with program delivering means and the program delivering means refers to said program reservation information and, if a reservation for the same program exists in the same time zone, conducts simultaneous transmission of the same program to a plurality of subscriber's terminals using the same routes of the transmission network.

7. A program reservation method comprising the steps of:

providing program reservation information generating means in a management center for generating program reservation information for transmitting to a subscriber's terminal for each route of a communication network;

providing reservation instruction inputting means in the subscriber's terminal for receiving a reservation setting of a subscriber; and providing displaying means for displaying the program reservation information generated by said program reservation information generating means delivering program information to said subscriber's terminal connected to said management center via the communication network, updating said program reservation information contents based on a reservation when the reservation is received from said subscriber's terminal in said program reservation information generating means.

8. The program reservation method according to claim 7, wherein said program reservation information includes at least a title of a program, delivery time of the program and number of reservations of the program.

9. A program reservation method according to claim 7, further comprising the steps in said management center;

providing reservation setting means for setting the program reservation based on an input from the reservation instruction inputting means of the subscriber's terminal;

calculating a number of reservations for each program based on set contents of said reservation setting means; and calculating a viewing fee based on the number of reservations for each program together with information from said program reservation information generating means.

10. The program reservation method according to claim 7, further comprising the steps of providing said management center with route identifying means and identifying the route to the subscriber's terminal, and generating program reservation information for each route based on information obtained from the route identifying means.

11. The program reservation method according to claim 7, further providing said program reservation information generating means with an exclusive view determining means for determining whether or not an exclusive view exists for each program and displaying whether or not the exclusive view exists for each program that is displayed as program reservation information based on information from the exclusive view determining means.

12. The program reservation method according to claim 7, further providing in said management center program delivering means that refers to said program reservation information and, if a reservation for the same program exists in the same time zone, conducting simultaneous transmission of the same program to a plurality of subscriber's terminals using the same routes of the transmission network.

* * * * *